United States Patent

Kikugawa et al.

Patent Number: 5,225,916
Date of Patent: Jul. 6, 1993

[54] IMAGE READING METHOD FOR AN IMAGE RECORDING SYSTEM

[75] Inventors: Makoto Kikugawa; Takashi Mori, both of Tokyo, Japan

[73] Assignee: Ricoh Company, Ltd., Tokyo, Japan

[21] Appl. No.: 626,333

[22] Filed: Dec. 13, 1990

Related U.S. Application Data

[63] Continuation of Ser. No. 244,103, Sep. 14, 1988, abandoned.

[30] Foreign Application Priority Data

Sep. 14, 1987 [JP] Japan ............... 62-228550
Dec. 25, 1987 [JP] Japan ............... 62-327415

[51] Int. Cl.⁵ .............. H04N 1/40; H04N 1/04; H04N 1/36
[52] U.S. Cl. .................. 358/471; 358/474; 358/494; 358/409
[58] Field of Search ........... 358/471, 474, 486, 445, 358/447, 448, 443, 409

[56] References Cited

U.S. PATENT DOCUMENTS

| | | | |
|---|---|---|---|
| 4,369,365 | 1/1983 | Bedford et al. | 358/409 |
| 4,384,307 | 5/1983 | Kuzmik et al. | 358/442 |
| 4,523,229 | 6/1985 | Kanmoto | 358/284 |
| 4,591,727 | 5/1986 | Gaebelein et al. | 358/288 |
| 4,652,934 | 3/1987 | Muroya et al. | 358/445 |
| 4,682,243 | 7/1987 | Hatayama | 358/451 |
| 4,841,375 | 6/1989 | Nakajima et al. | 353/442 |

Primary Examiner—Edward L. Coles, Sr.
Assistant Examiner—Thomas D. Lee
Attorney, Agent, or Firm—Oblon, Spivak, McClelland, Maier, Neustadt

[57] ABSTRACT

An image reading method for an image recording system which reads an image with an image reader in the form of photoelectric signal conversion devices, converts the resulting analog data into digital data, and prints out the digital data with a printer. One line of image is read a plurality of times by the image reader and the resulting image data are sequentially stored. Even when the image data storing time and a fixed one-line scanning period are different from each other, the image can be read and outputted without changing the quantity of light to be applied to the image reader, i.e., simply by compensating for the difference between the storing time and the fixed scanning time. The compensation is implemented by multiplying one line of data stored by a time ratio of the fixed period to the difference, or adopting all the data inclusive of those associated with the difference, or discarding the data associated with the difference, or adopting only valid data, and then averaging the resulting data by division.

6 Claims, 14 Drawing Sheets

Fig. 5A Lsync
Fig. 5B SH
Fig. 5C G1
Fig. 5D G2
Fig. 5E G3
Fig. 5F W/R
Fig. 5G CLK READ WRITE
Fig. 5H SH
Fig. 5I L1

Fig. 10E  G3
Fig. 10F  W/R
Fig. 10G  CLK WRITE READ
Fig. 10H  SH
Fig. 10I  LI

Fig. 11F  W/R

Fig. 11G  CLK  WRITE / READ

Fig. 12E  G3
Fig. 12F  W/R
Fig. 12G  CLK  WRITE READ
Fig. 12H  SH
Fig. 12I  L1

IMAGE READING METHOD FOR AN IMAGE RECORDING SYSTEM

This application is a continuation of application Ser. No. 07/244,103, filed on Sep. 14, 1988, now abandoned.

BACKGROUND OF THE INVENTION

The present invention relates to an image reading method for an image recording system which reads an image with an image reader in the form of an array of photoelectric signal converting devices, converts the resulting analog image data into digital image data, and then prints out the digital data with a printer.

There has been extensively used an image recording system which generally comprises an image reader, or scanner, for reading an original document by scanning it in a main scanning and a subscanning direction, an analog-to-digital (A/D) converter for converting the image read into digital data, and a printer for printing out the digital data which may be implemented as a dot printer. The scanner is usually implemented by an array of CCDs (Charge Coupled Devices) or similar photoelectric signal converting devices. In this kind of image recording system, the period of time necessary for the scanner to read one whole line and the period of time necessary for the printer to print out one whole line in dots is synchronous to each other. It follows that the one-line reading time or scanning time of the scanner has to be changed depending upon the printing time which differs from one kind of printer to another. On the other hand, the quantity of light which is to become incident to the CCDs from a lamp such as a fluorescent lamp while the scanner scans an image is predetermined in matching relationship to the one-line scanning time. Hence, in an image recording system with which a plurality of different kinds of printers are usable, the quantity of light to be incident to the CCDs has to be changed every time a printer is changed. This results in the need for special control means for adequately changing the above-mentioned quantity of light every time the printer and therefore one-line printing time is changed, rendering the entire system complicated.

SUMMARY OF THE INVENTION

It is therefore an object of the present invention to provide an image reading method for an image recording system which, even when the one-line reading time of an image reader is changed due to a change in the printing rate of the attached printer, is capable of reading an image while maintaining the quantity of light incident to CCDs unchanged.

It is another object of the present invention to provide a generally improved image reading method for an image recording system.

An image reading method for an image recording system of the present invention comprises the steps of (a) reading an image having a one-line period a plurality of times to produce image data, (b) sequentially storing the image data, and, (c) when a storing time and a fixed one-line scanning period are different from each other, dividing the stored image data by the number of times that the image is read, after compensating for a difference between the storing time and the one-line scanning period.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
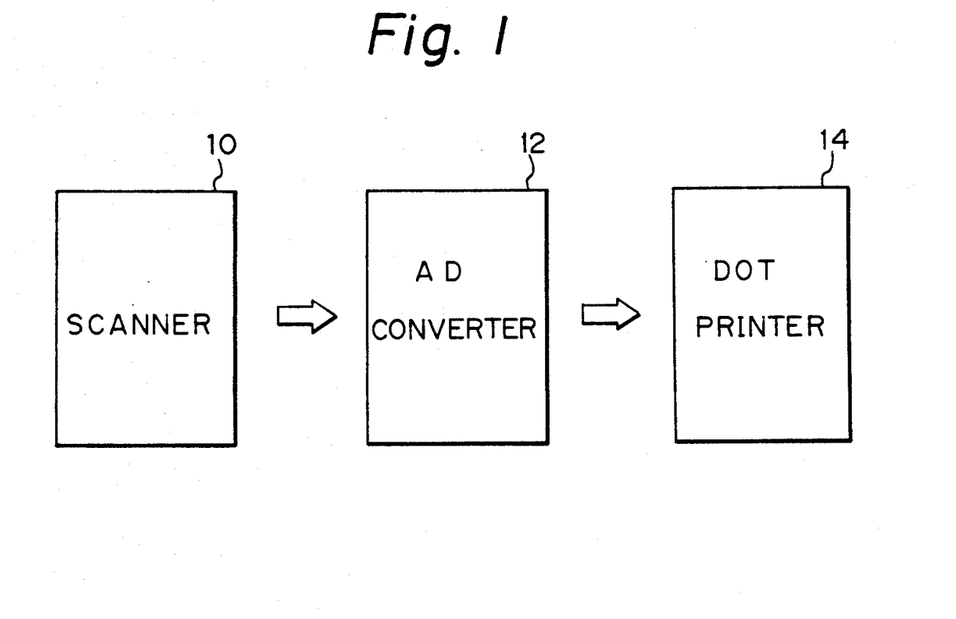
FIG. 1 is a schematic block diagram of an image recording system to which the present invention is applicable.
Figure 2:
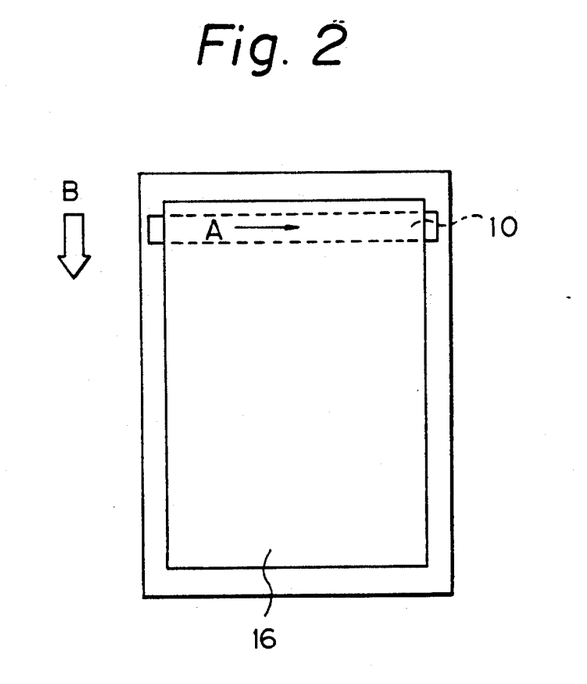
FIG. 2 is a view schematically showing how a scanner shown in FIG. 1 scans an original document.

Referring to FIG. 1 of the drawings, an image recording system to which the present invention is applicable is generally made up of an image reader or scanner 10 which is implemented by CCDs, an AD converter 12 for applying analog-to-digital conversion to an output signal of the scanner 10, and a dot printer 14 for printing out the image which has undergone such conversion by way of dots. As shown in FIG. 2, the scanner 10 scans the image surface of an original document 16 in a line by line fashion in a main scanning direction as indicated by an arrow A while scanning it in a subscanning direction as indicated by an arrow B.

Figure 3A:
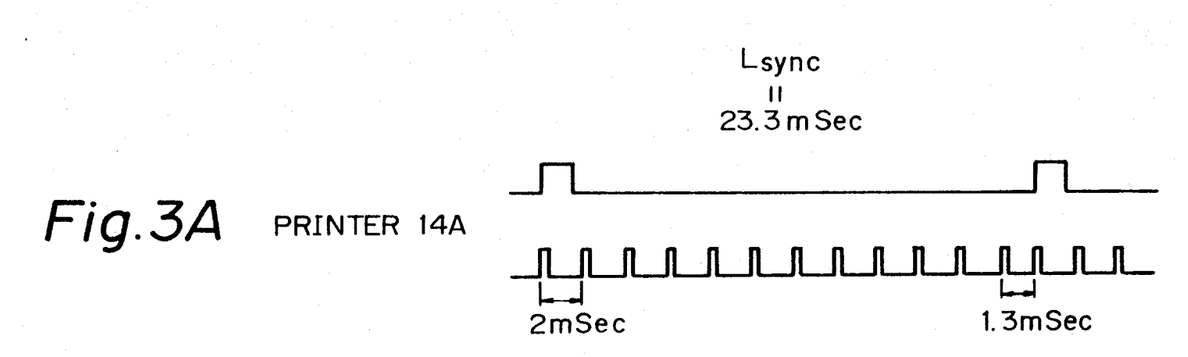
FIGS. 3A and 3B show line period signals and read shift signals which are individually associated with the line period signals.
Figure 3B:
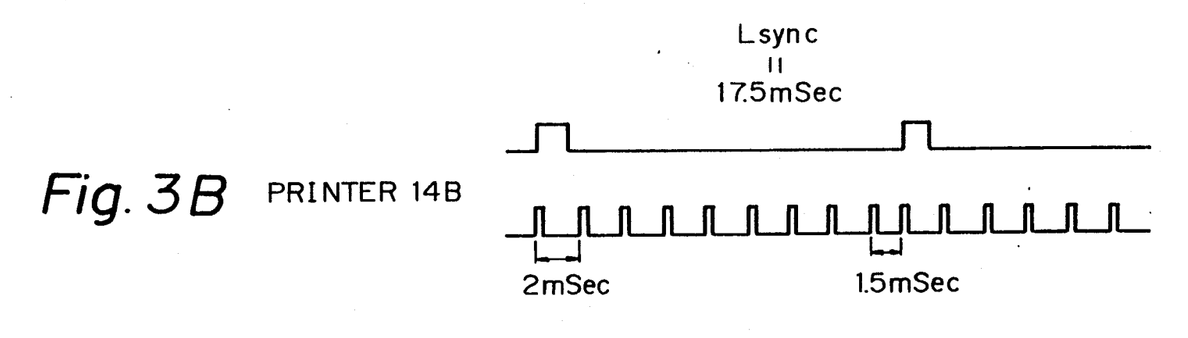

In this kind of image recording system, the reading time for the scanner 10 to read one line of the document 16 and the printing time for the printer 14 to print out one line of dots are synchronous to each other. It follows that the one-line reading time of the scanner 10 has to be changed depending upon the printing time which differs from one kind of printer 14 to another, as previously stated. On the other hand, the quantity of light which is to become incident to the CCDs from a lamp such as a fluorescent lamp while the scanner 10 scans an image is predetermined in matching relation to the reading time of the scanner 10. For example, FIGS. 3A and 3B show respectively the one-line printing times, or line periods, Lsync of printers 14A and 14B which are different in printing principle from each other. Assume for example, that the printer 14A has a one-line printing time, or line period, Lsync of 23.5 milliseconds as shown in FIG. 3A and this printer is in use and that the amount of light which is set for the CCDs of the scanner 10 at this time is LA. When this type of printer 14A is replaced with another type of printer whose one-line printing time or line period Lsync is 17.5 milliseconds for example as shown in FIG. 3B is used, the scanner 10 is incapable of adequately reading a document unless the quantity of light LA is replaced with another quantity of light LB which is associated with the new printer. It has therefore been customary to change the intensity of light issuing from a lamp which is adapted to apply light to the CCDs of the scanner 10, every time the printer 14 and therefore its printing time is changed. This adds extra and complicated control means.

In accordance with the present invention, the CCDs of the scanner 10 are arranged to define 3,360 pixels (sixteen pixels per millimeter; 210 millimeters wide) by way of an example. While the quantity of light LA associated with the line period LSYNC of 23.3 milliseconds as shown in FIG. 3A is applied to the CCDs, charges are stored in the form of an analog signal which is representive of 3,360 pixels. The 3,360-pixel analog signal is once stored in a horizontal shift register which is connected to the CCDs and then converted by the AD converter 12 into, for example, eight-bit digital data. When the line period Lsync is 17.5 milliseconds as shown in FIG. 3B, the same procedure as stated above is executed except that the quantity of light LA is replaced with another quantity of light LB.

Assume that the quantity of light issuing from a fluorescent lamp, for example, is selected to have a value of LC which allows data to be read in 2 milliseconds. Then, considering the line period Lsync of 23.3 milliseconds associated with the quantity of light LA, the 3,360-pixel digital data on one whole line may be read eleven consecutive times plus a fragment which is associated with the residue of 1.3 milliseconds, i.e. twelve times in total. Here, the first to the 3360-th pixel read by the twelfth reading are not those which have been read at the period of 2 milliseconds. Hence, the first to the 3360-th pixels (i.e. the entire line) are multiplied by the time ratio of 2 milliseconds to 1.3 milliseconds, i.e., 2/1.3 and, then, the first to 3360-th pixels read twelve times in total are averaged to reproduce image data. Likewise, in the case of the line period Lsync of 17.5 milliseconds which is associated with the quantity of light LB, data produced by eight times of reading at the period of 2 milliseconds and data produced by multiplying the data read by the ninth reading by 2/1.5 are averaged on a pixel basis to produce data.

A preferred embodiment of the present invention will hereinafter be described with reference to the drawings.

Figure 4:
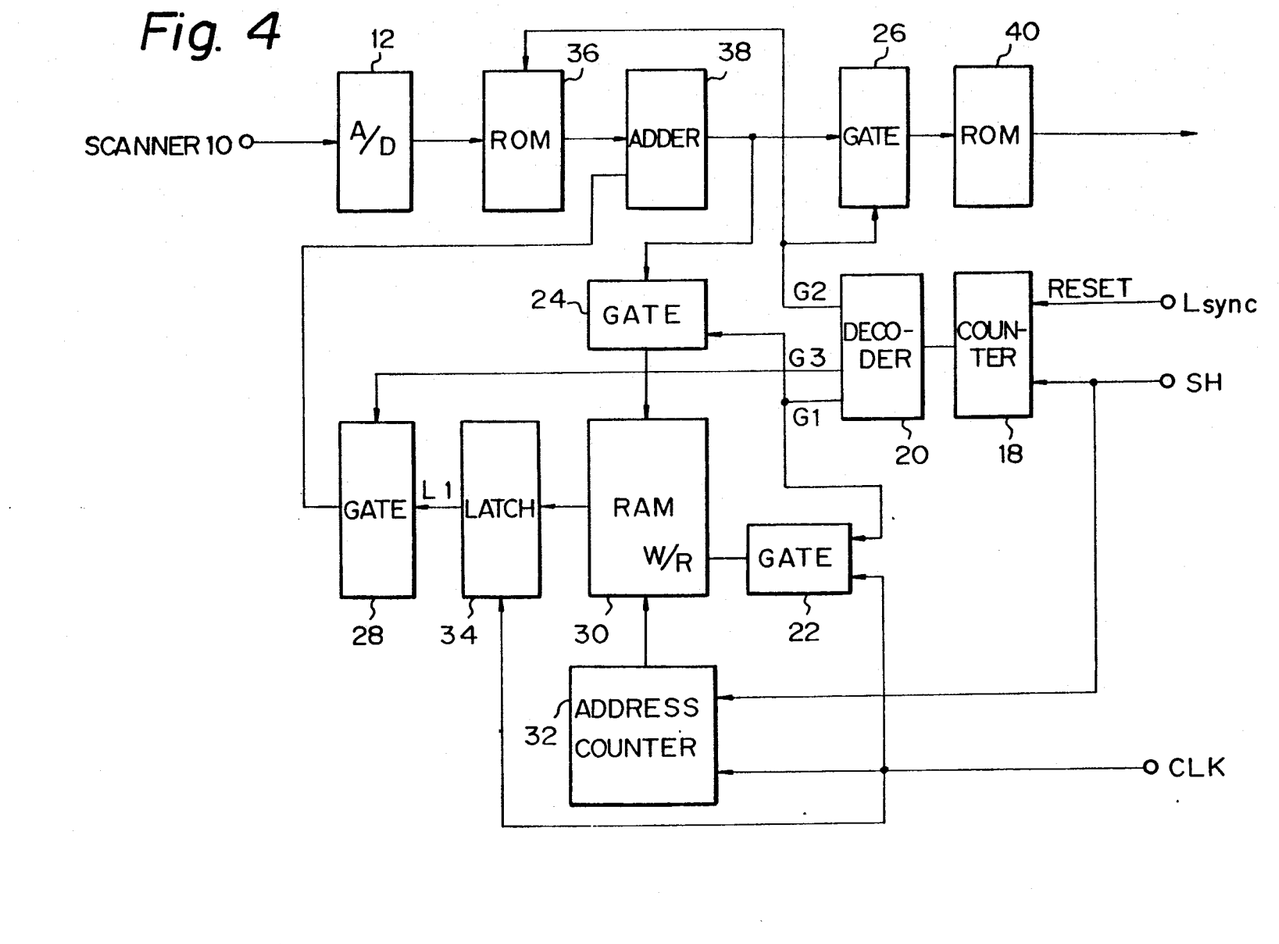
FIG. 4 is a schematic block diagram representative of a preferred embodiment of the present invention.
Figure 6:
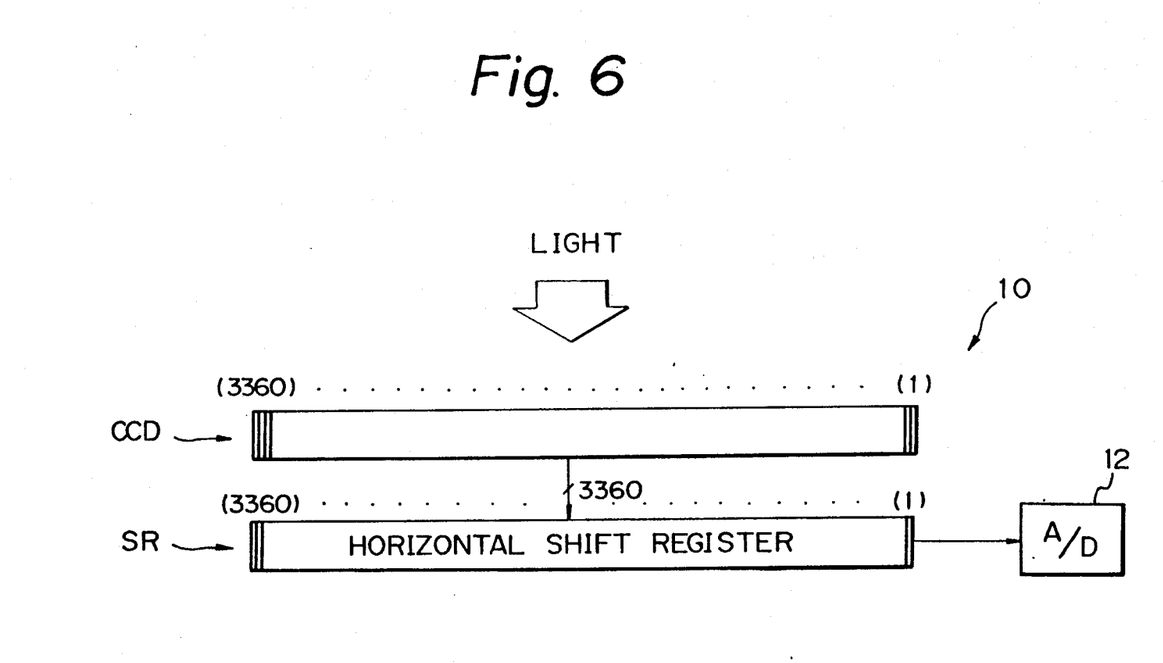
FIG. 6 is a view schematically showing a scanner which is implemented by a CCD array.

FIG. 4 is a block diagram schematically showing a circuit arrangement for producing mean values of data read as discussed above. FIGS. 5A to 5H show waveforms of signals which appear in various portions of the circuit of FIG. 4. Further, FIG. 6 shows a specific construction of the scanner 10. As shown in FIG. 4, the circuit includes a counter 18 to which is applied a line period signal Lsync (FIG. 5A) which is associated with any of the previously mentioned quantity of lights LA and LB. Also applied to the counter 18 is a read shift signal SH which is the same as a read shift signal SH (FIG. 5B) that is fed to a horizontal shift register SR shown in FIG. 6. The counter 18 counts the read shift signals SH in synchronism with the line period signal Lsync. Supplied with an output of the counter 18, a decoder 20 applies gate signals $G_1$, $G_2$ and $G_3$ (FIGS. 5C to 5E) to gates 22, 24, 26 and 28 at particular timings shown in FIGS. 5C to 5E so as to enable and disenable them. On the other hand, a clock signal CLK serves as an image synchronizing signal (FIG. 5G) is fed to the gate 22, an address counter 32 which is associated with a RAM 30 for storing data read, and a latch circuit 34.

Figure 5A:
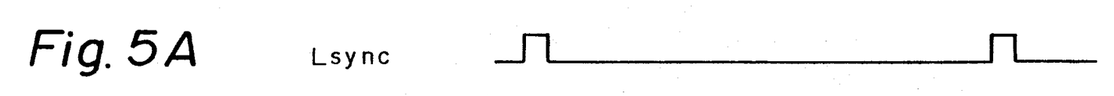
FIGS. 5A to 5H are timing charts useful for understanding the operations of various blocks which are shown in FIG. 4.
Figure 5B:
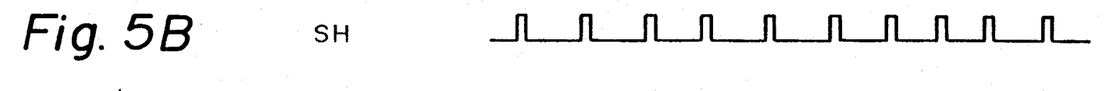
Figure 5C:
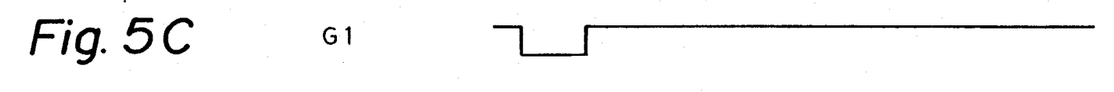
Figure 5D:
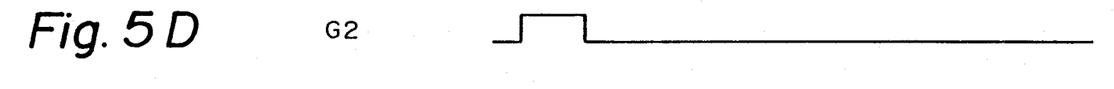
Figure 5E:
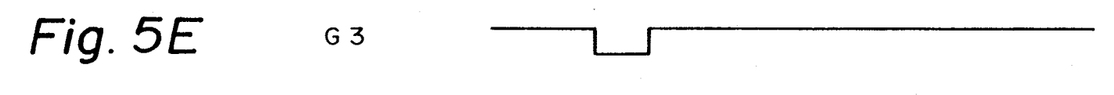
Figure 5F:
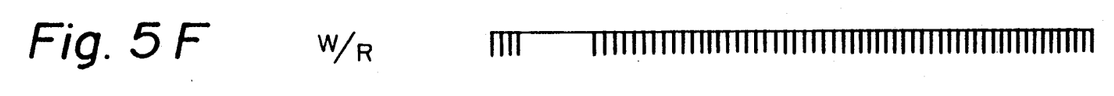
Figure 5G:
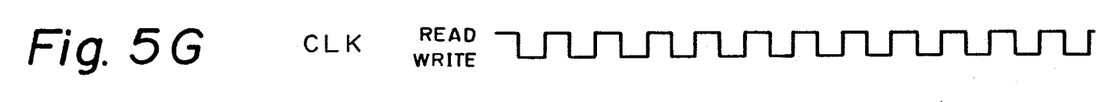
Figure 5H:
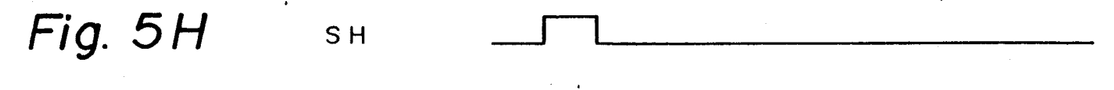
Figure 5I:
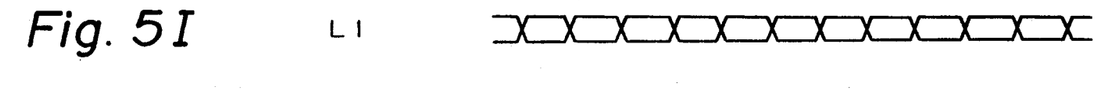

It is to be noted that a signal SH shown in FIG. 5H is identical with the read shift signal SH (FIG. 5B) and indicates in an enlarged scale the relationship between the clock signal CLK (FIG. 5G) and the output $L_1$ (FIG. 5I) of the latch circuit 34. The RAM 30 is placed into a read mode and a write mode by the gate 22 and address counter 32 at the timings which are shown in FIG. 5F.

Digital data outputted by the AD converter 12 are delivered via a ROM 36 having a multiplying function, an adder 38 and the gate 24 to those addresses of the RAM 30 which are designated by the address counter 32, at each fixed period of 2 milliseconds. More specifically, in the case of the quantity of light LA or LB shown in FIG. 3A or 3B, digital data read eleven or nine times are fed to the ROM 36 and held by the latch circuit 34. As the digital data read during the remaining 1.3 or 1.5 milliseconds are fed to the ROM 36, those signals are multiplied by the time ratio of the previously mentioned 2 milliseconds to 1.3 or 1.5 milliseconds, i.e., 1/1.3 or 2/1.5 and the resulting values are summed by the adder 38 (twelve or nine times in total). The output of the adder 38 is routed through the gate 26 to a ROM 40 having a dividing function. Then, the ROM 40 produces mean values of the first to the 3360th pixels on a pixel basis as digital data outputs.

Before describing another embodiment of the present invention, a reference will be made to FIGS. 7 and 8 which show respectively a specific device circuit of the scanner 10 and the format of an image signal.

Figure 7:
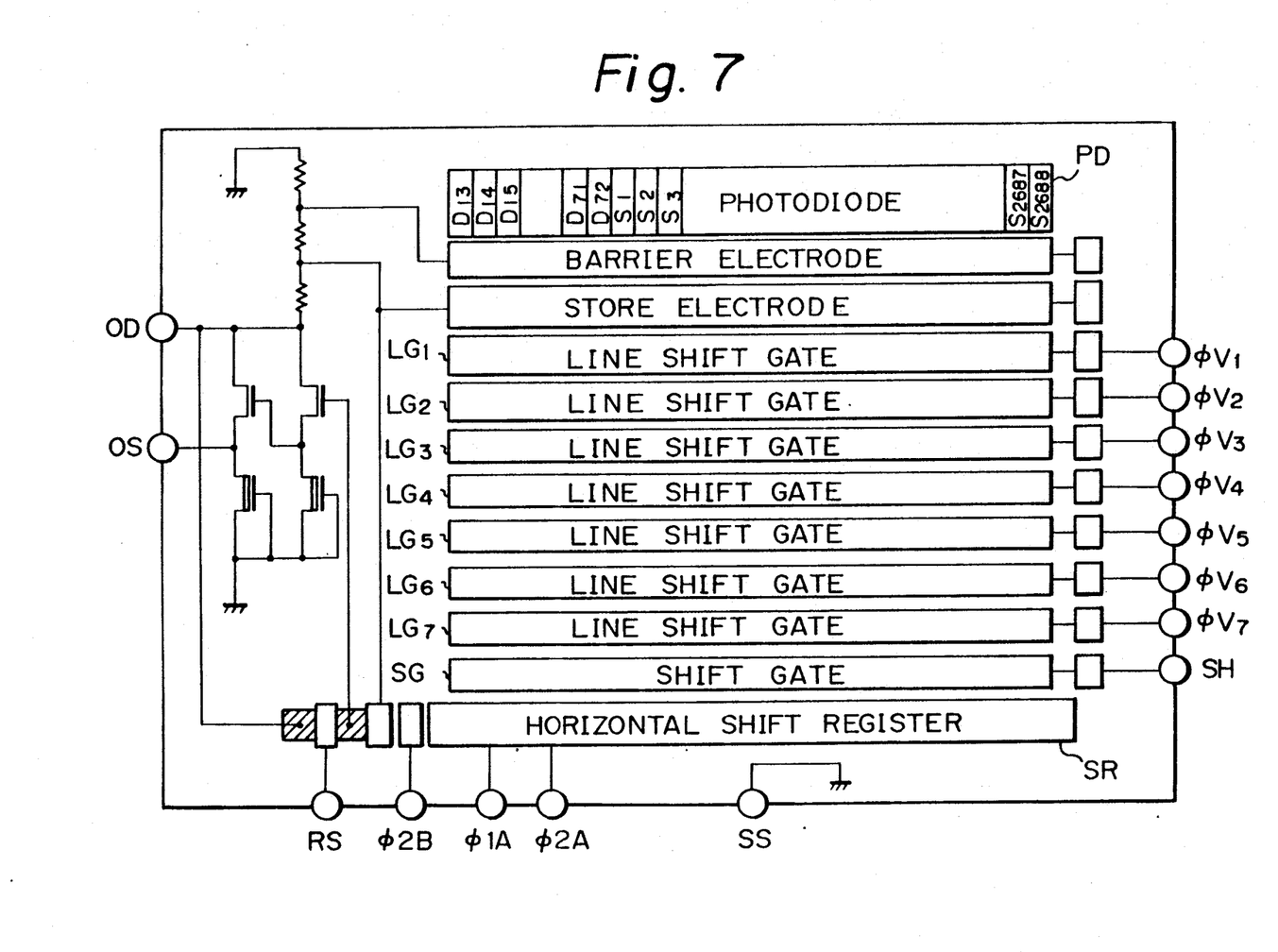
FIG. 7 is a device circuit diagram representative of the scanner of FIG. 6.
Figure 8:
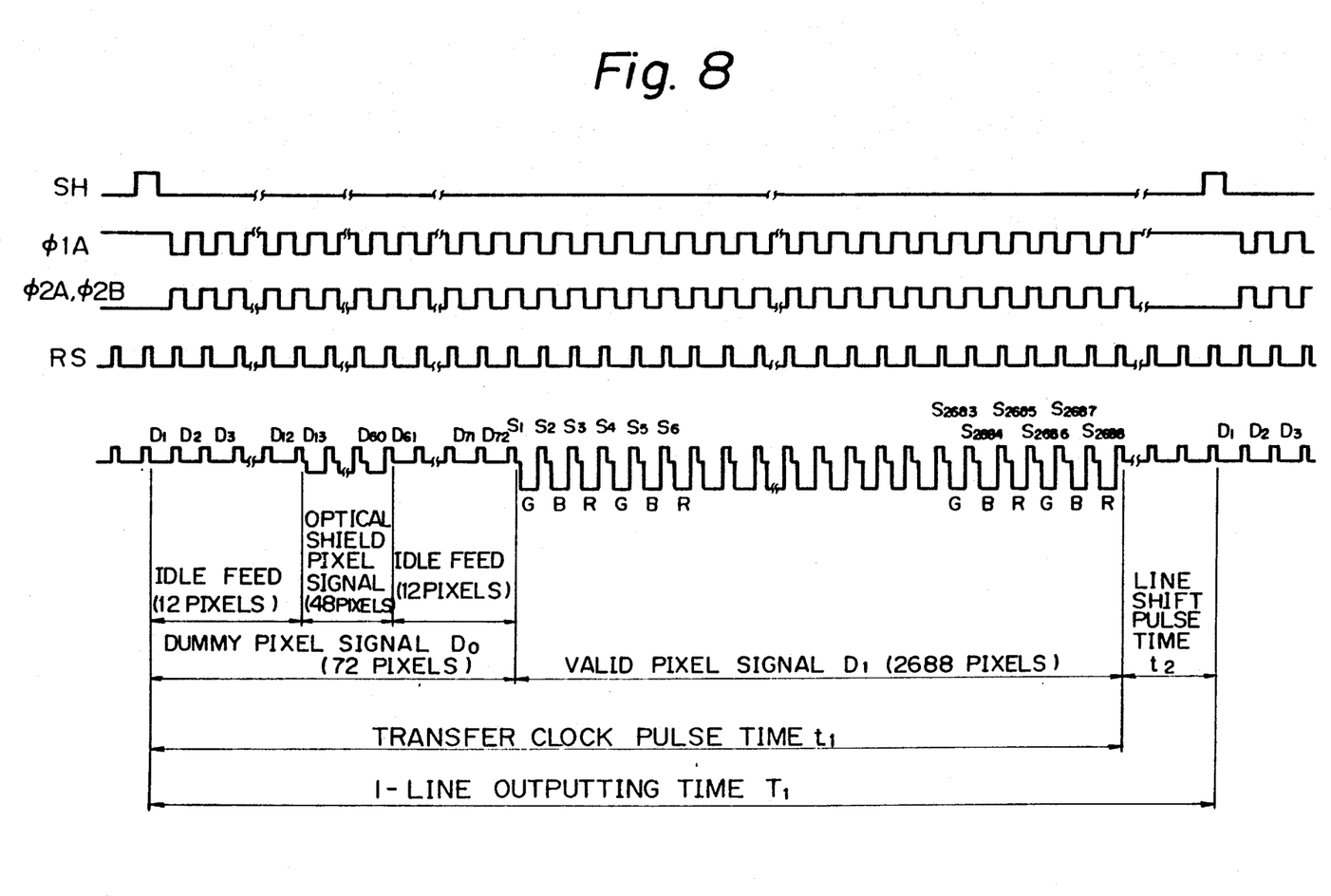
FIG. 8 shows the format of a video signal which occurs during a one-line outputting time.

In FIG. 7, photodiodes PD for reading an image are sequentially shifted in line shift gates $LG_1$ to $LG_7$ by line shift gate signals $\phi V_1$ to $\phi V_7$. Then the image data are transferred by the read shift signal SH from a shift gate SG to the horizontal shift register SR which is constituted by CCDs to be stored in the shift register SR. The image data stored in the horizontal shift register SR are read out as represented by the timing chart of FIG. 8. As shown, a one-line outputting time $T_1$ during which data are read out by the read shift signal SH is made up of a transfer clock pulse time $t_1$ consisting of a dummy pixel signal $D_0$ and a valid pixel signal $D_1$, and a line shift pulse time $t_1$. The dummy pixel signal $D_0$ is consituted by idle pixel feeds (twelve pixels each) and an optical shield pixel signal (forty-eight pixels) which is interposed between the idle feeds. In this particular embodiment, the valid pixel signal $D_1$ includes a green (G), a blue (B) and a red (R) component. In FIGS. 7 and 8, OD is representative of an output transistor drain, OS is representative of an output transistor source, SS is representative of a substrate (ground), RS is representative of a reset gate $\phi_1 A$ is representative of a clock of first phase, $\phi_2 A$ is representative of a clock of second phase, and $\phi_2 B$ is representative of a clock of final stage.

Figure 9:
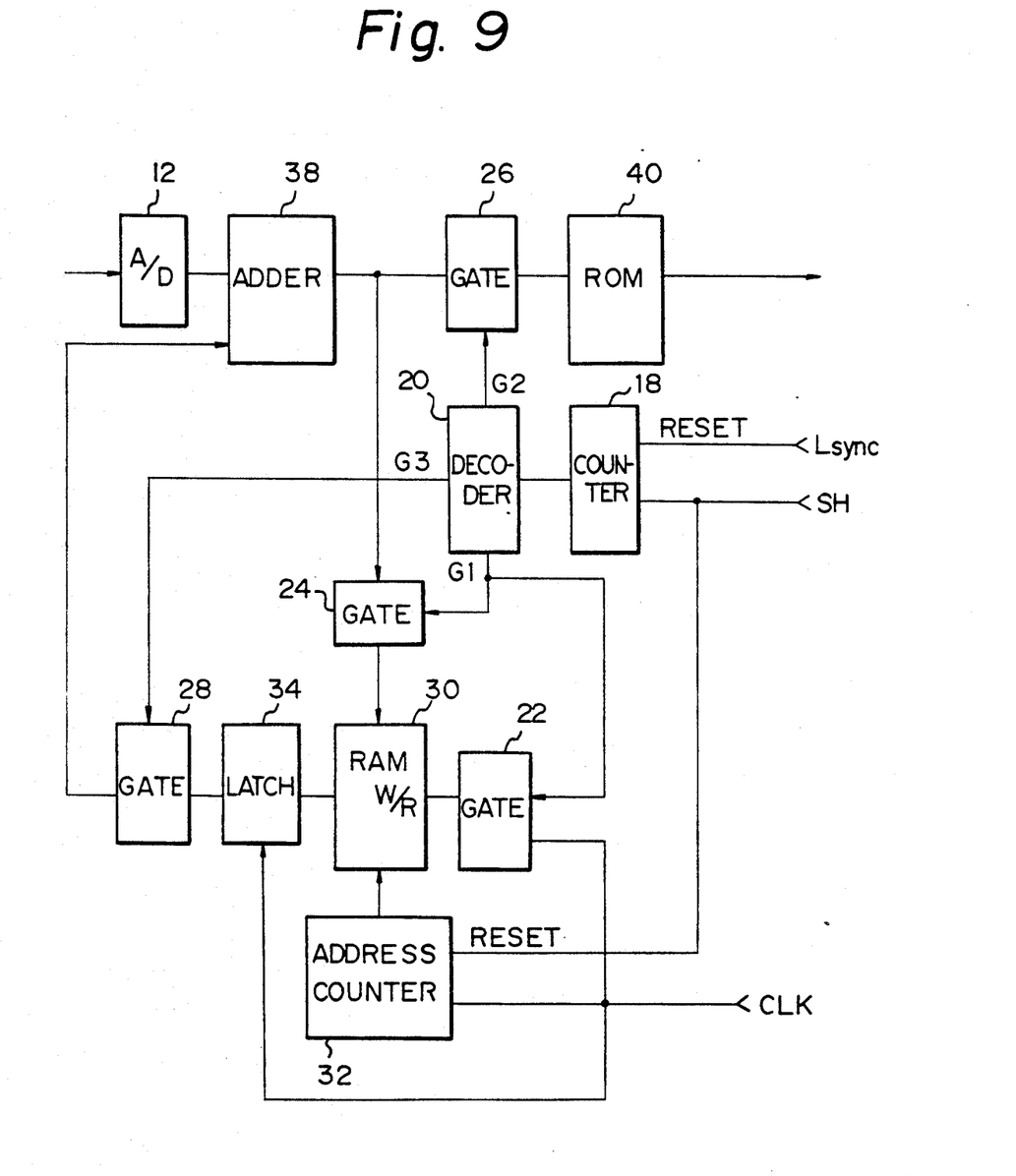
FIG. 9 is a schematic block diagram showing another embodiment of the present invention.
Figures 10A, 10B:
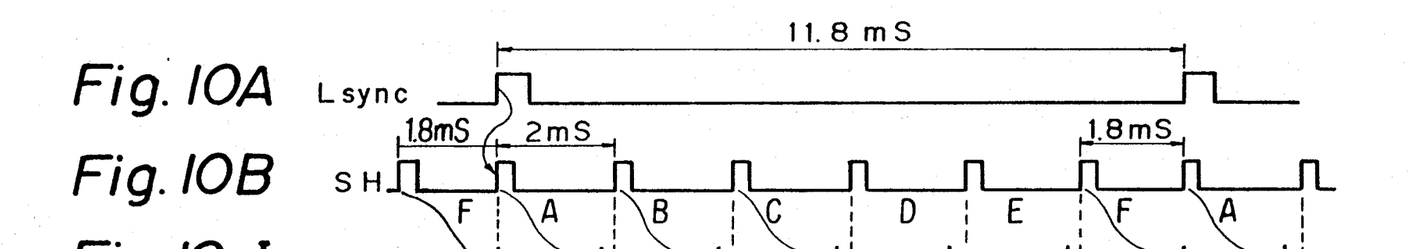
FIGS. 10A to 10J, 11A to 11J and 12A to 12J show data processing timings each being associated with a different embodiment of the present invention.
Figure 10C:
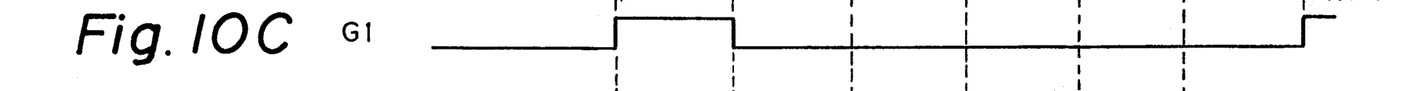
Figure 10D:
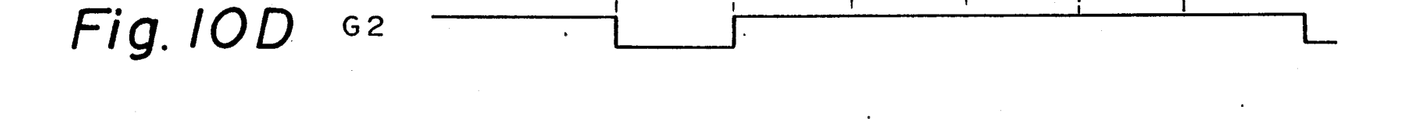
Figure 10E:
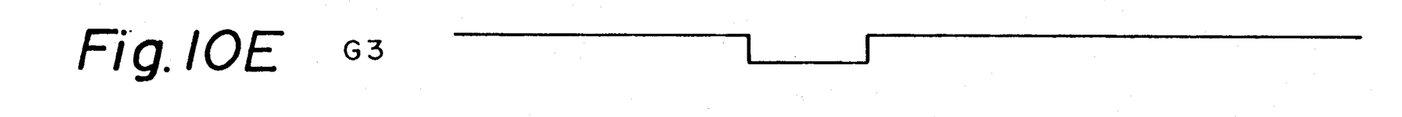
Figure 10F:
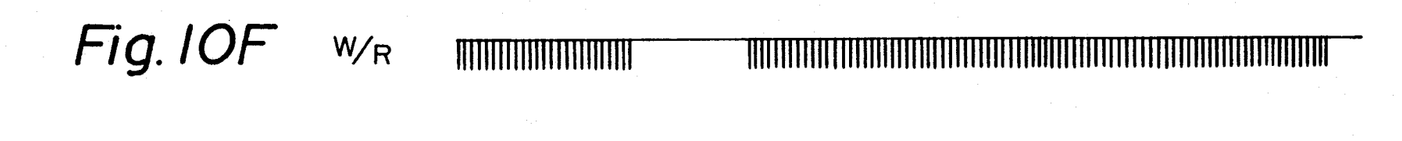
Figures 10G, 10H:
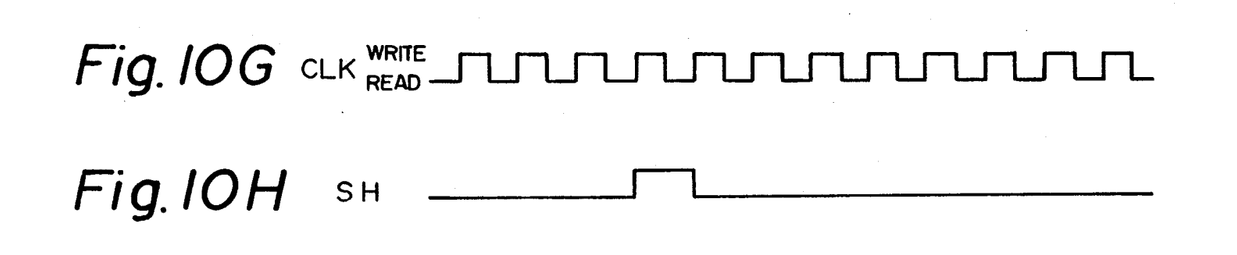
Figure 10I:
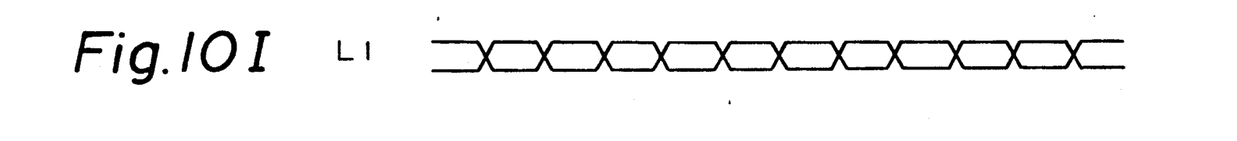
Figure 10J:
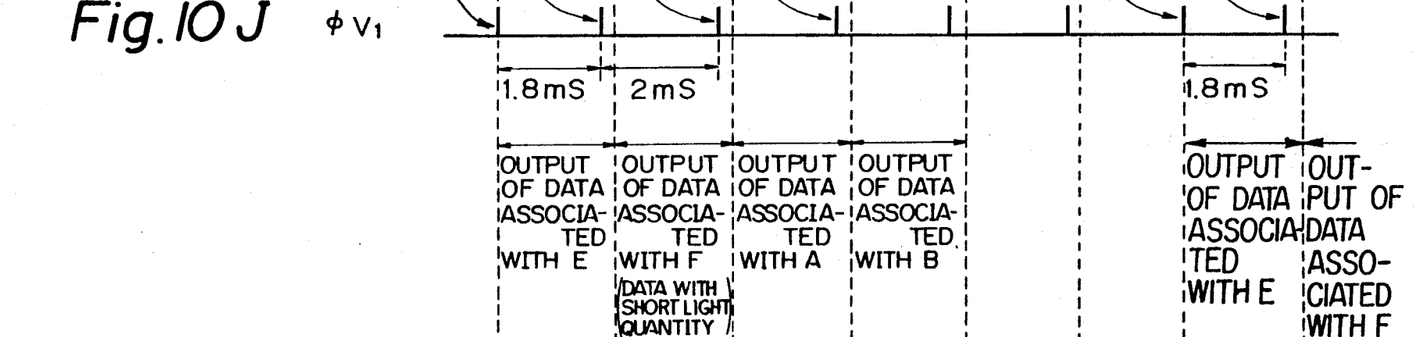

Referring to FIG. 9, there is shown a circuit for averaging the data which has been read. In FIG. 9, the same structural elements as those shown in FIG. 4 are designated by like reference numerals, and the ROM 36 having a multiplying function is omitted. FIGS. 10A to 10J are timing charts demonstrating the operations of various blocks of FIG. 9 and, in these figures, the same signal components as those shown in FIGS. 5A to 5H are designated by like reference characters. Assuming that the one-line period Lsync is 11.8 milliseconds and the reading period (read shift signal SH) is 2 milliseconds, the flow of data from the horizontal shift register SR (FIG. 7) will be described. As the line period Lsync shown in FIG. 10A rises, the read shift signals SH (FIG.

10B) are sequentially fed to the horizontal shift register SR at equal intervals of 2 milliseconds as A, B, C, ..., D. At this instant, a line shift gate signal $\phi v_1$ which is one of line shift gate signals is fed to the horizontal shift register SR to define a period of time for storing an optical signal. Hence, an optical signal appeared before the arrival of the signal $\phi v_1$ is loaded as data in the line shift gate $LG_1$ of FIG. 7. Then, the data are outputted in response to the next read shift signal SH. The transfer clock time is therefore the period of time during which the dummy pixel signal $D_0$ and valid pixel signal $D_1$ are outputted in response to the clock $\phi_1 A$. The line shift time is representative of the duration of the line shift gate signals $\phi v_1$ to $\phi v_7$.

As described above, when the line period Lsync is 11.8 milliseconds, the stages A to E shown in FIGS. 10A to 10J are sequentially read out by the read shift signals SH which appear at each interval of 2 milliseconds. At the final stage F, a residual or error time of 1.8 milliseconds ($\epsilon$) which is short of 2 milliseconds is left. Consequently, the interval between the line shift gate signal $\phi v_1$ of the stage F and the same signal $\phi v_1$ of the following stage A becomes 1.8 milliseconds, causing data with a smaller quantity of light than at the other stages A to E to appear at the next stage B. In this embodiment, the data which appear in all the stages A to F are averaged to provide data which are associated with one whole line. At the stage C where data read at the stage A are outputted, the gate 28 of the RAM 30 is disenabled by the gate signal $G_3$ which is fed from the decoder 20 and, therefore, the data applied to the adder 38 are delivered to the RAM 30 via the gate 24 which is enabled by the gate signal $G_1$ and not added together.

Next, at the stage D where data read at the stage B are to be outputted, the gate 28 is enabled by the gate signal $G_3$ so that the data associated with the preceding stage A (i.e. data stored in the RAM 30) are fed to the adder 38. Hence, the data read at the stage B are added by the adder 38 and applied to the RAM 30 again via the gate 24 which is enabled by the gate signal $G_1$. In the same manner, data are sequentially added at the respective stages C to E. As mentioned above, the data associated with the stage F has a smaller quantity of light. Thus, at the stage B where data read at the stage F are to be outputted, the data is fed to the ROM 36 and multiplied by the time ratio of the 2 milliseconds to 1.8 milliseconds, i.e., 2/1.8. When all the data associated with the stages A to F have been summed by the adder 38 at the stage A, the gate 26 is enabled by the gate signal $G_2$ to pass the sum to the ROM 40. This data is divided by the number of stages, i.e., six (A to F) and the mean value is used for one line of image data. More specifically, since data read six times are averaged, any change in the line period Lsync can be accommodated without changing the quantity of light issuing from a fluorescent lamp, i.e., simply by changing the number of times or divisor. In addition, there is no chance of omission of data because the entire document (data) are read.

Figure 11A:
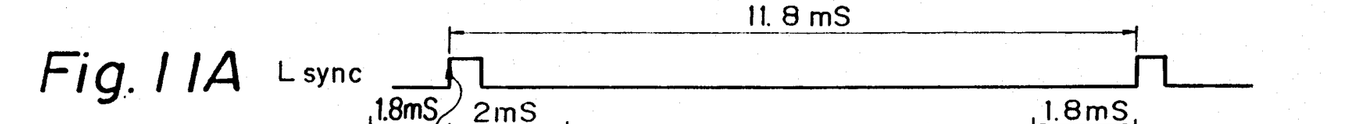
Figures 11B, 11J:
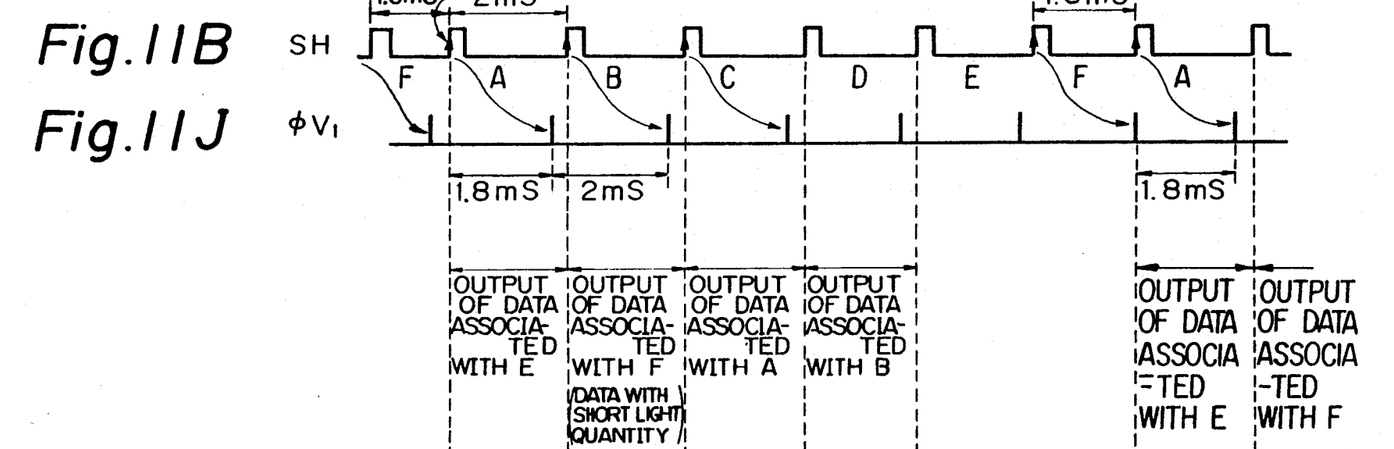
Figures 11C, 11D:
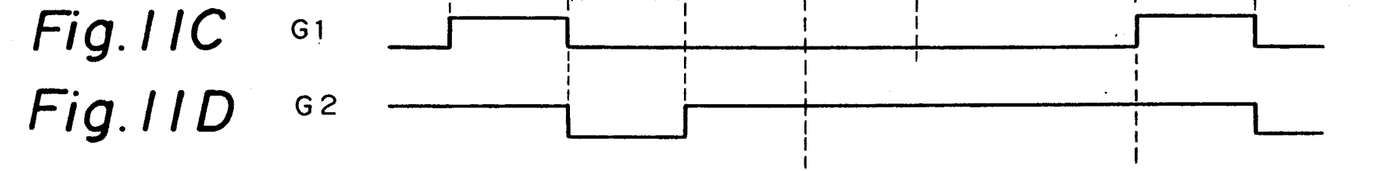
Figure 11E:
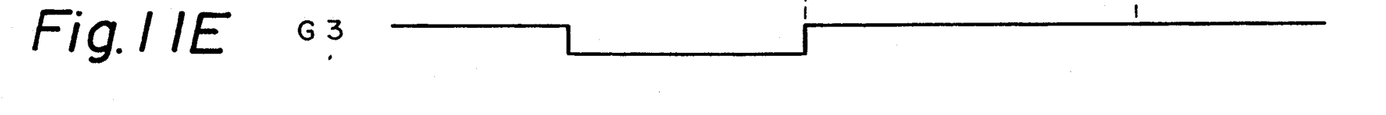
Figure 11F:
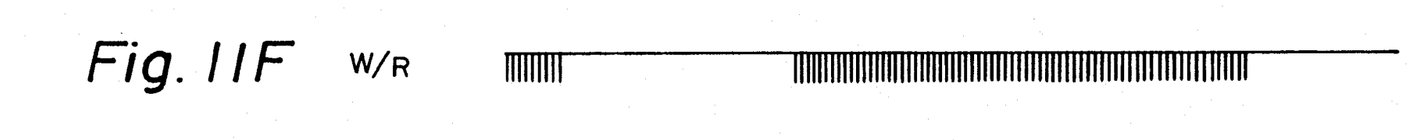
Figure 11G:
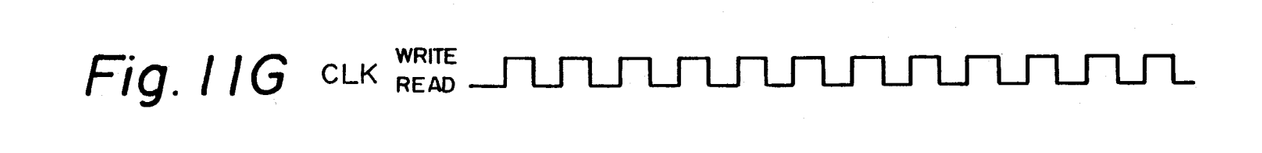
Figures 11H, 11I:
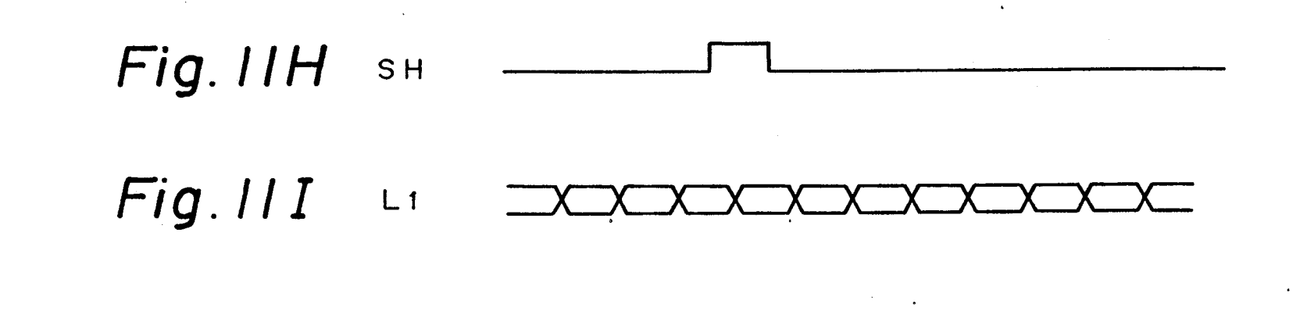
Figure 12A:
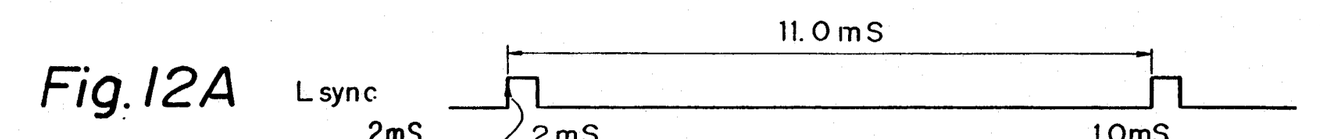
Figure 12B:
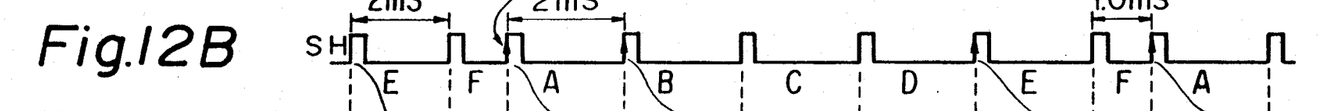
Figures 12C, 12D:
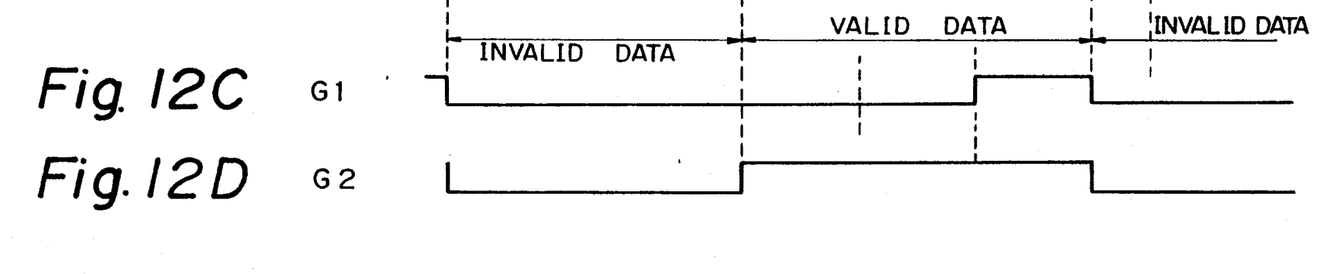
Figure 12E:
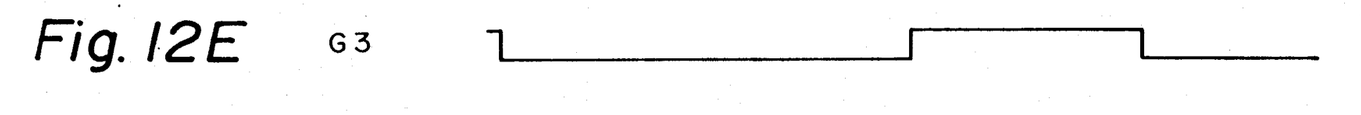
Figure 12F:
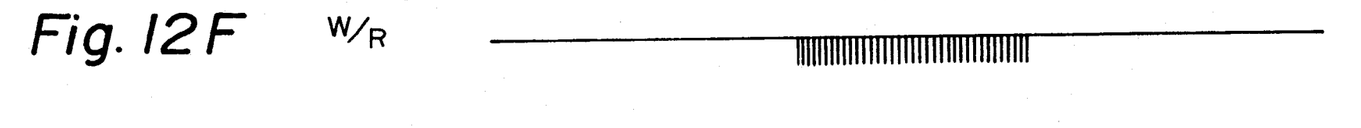
Figure 12G:
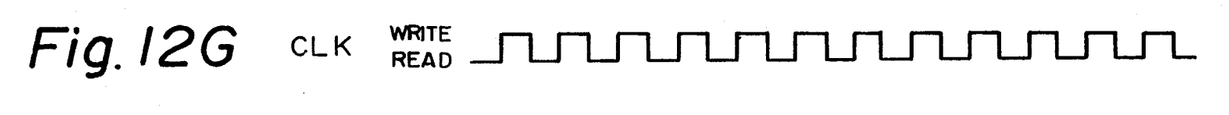
Figure 12H:
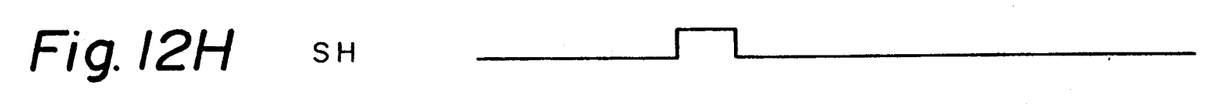
Figure 12I:
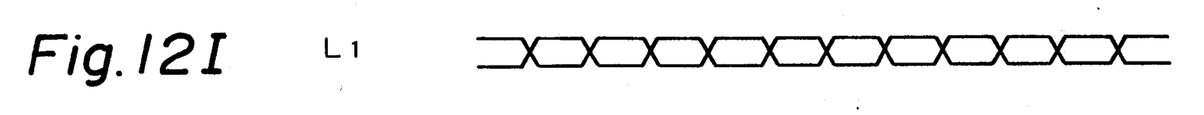
Figure 12J:
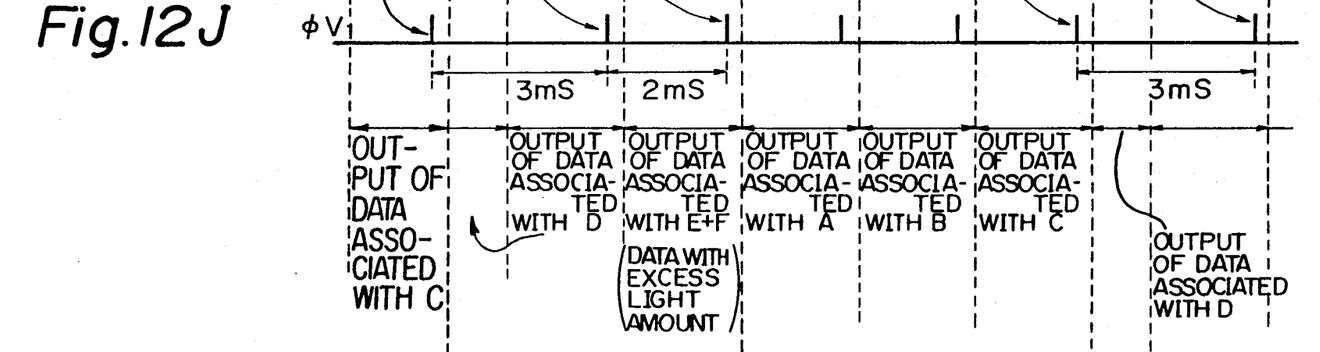

Referring to FIGS. 11A to 11J, there are shown timing charts representative of another embodiment of the present invention which practically discards those data which are read during the shorter light-receiving time, i.e., error time ($\epsilon$) while averaging data which are read during normal light-receiving times. Data associate with the stages A to E are added together by the adder 38 by the operation of FIG. 9 as in FIGS. 10A to 10J. The gate 26 is enabled by the gate signal $G_2$ to apply the sum to the ROM 40. In the ROM 40, the sum data is divided by the number of stages, i.e., five (A to E) to produce one line of image data. At the stage B where data associated with the last stage F where the reading time is shorter, the gates 26, 28 and 24 are respectively disenabled by the gates signals $G_2$, $G_3$ and $G_1$, as shown in FIGS. 11C to 11E. As a result, the data associated with the stage F are cut off. It follows that, even if the line period Lsync is changed, all that is required is changing the divisor for producing the mean value. Further, the accuracy of operation remains stable because the mean value is provided by using only those data which have the same light quantity storage time.

FIGS. 12A to 12J are timing charts representative of still another embodiment of the present invention in which, when the one-line outputting time $T_1$ which is the sum of the transfer clock time $t_1$ and the line shift pulse time $t_2$ is shorter than the error time $\epsilon$, only valid data are averaged to produce one line of image data. Specifically, assuming that the line period time Lsync is 11.0 milliseconds, reading one line of data with the read shift signals SH of 2 milliseconds causes 1 millisecond to remain as a residue or error time $\epsilon$. When the error time is as short as 1 millisecond as mentioned, the read shift signal SH associated with the stage F of the next line period Lsync before the transfer clock pulse time $t_1$ (FIG. 8) expires and, hence, data associated with the stage E becomes invalid. For example, assuming that one pixel is transferred in 0.6 millisecond microsecond of transfer clock pulse time $t_1$, it is impossible to transfer all the pixels unless (dummy pixel signal 72 + valid pixel signal 2688) × 0.6 microsecond = 1.66 milliseconds are secured. Moreover, since the line shift gate signal $\phi v_1$ is not received at the stage F, 3 milliseconds up to instant of appearance of the line shift gate signal $\phi v_1$ for the stage A of the next line period Lsync constitute the optical signal storage time of the stage E, resulting in that the data read at the stage E has an excessive quantity of light. Therefore, data associated with the stage B (stage E + stage F) at which the data read at the stage E are outputted become invalid also. Data associated with the stage F (stage D) also become invalid.

In the light of the above, this particular embodiment cuts off invalid data which appear at the stages E, F and B and averages only valid data appearing at the stages C, D and E to provide one line of image data. More specifically, at the stage C where data read at the stage A are outputed, the gate 28 is disenabled by the gate signal G3 to prevent the data from being applied to the adder 38. Instead, the gate 24 is enabled by the gate signal $G_1$ to apply the data to the RAM 30. At the subsequent stage D where data read at the stage B are outputted, the gate 28 is enabled by the gate signal G3 to feed the data associated with the preceding stage B to the adder 38. Then, the data are added by the adder 38 and written in the RAM 30 again via the gate 24 which is enabled by the gate signal $G_1$. As the gate 26 is enabled by the gate signal $G_2$ at the stage E, the output of the adder 38 and data of that instant are added together. Supplied with the resulting sum, the ROM 40 divides the sum by the number of stages, i.e., three (C, D and E) to produce one line of image data. At the stages F, A and B where invalid data are produced, the gates 26, 28 and 24 are disenabled by the gate signals G2, G3 and G1, respectively. In this condition, the invalid data are entirely cut off.

The illustrative embodiment described above allows the quantity of light issuing from a fluorescent lamp to remain unchanged despite a change in the line period Lsync, only if the number of times which serves as a divisor is changed. In addition, data attainable with this embodiment is of high quality because it discards incomplete data and data having an excessively long light quantity storage time by regarding them invalid.

In summary, in accordance with the present invention, one line of images are read a plurality of times and the resulting image data are sequentially stored. When the storage time and a fixed one-line scanning time are different from each other, the residue or error time is divided by the time ratio to produce a mean value or, alternatively, data are averaged by including or discarding the error time or, alternatively, only valid data are averaged so as to produce one line of image data. Hence, any change in reading speed can be accommodated simply by changing a procedure for processing the image data, i.e., while maintaining the quantity of light issuing from a fluorescent lamp unchanged. Furthermore, the present invention allows the line period Lsync to be changed with a dark current remaining stable, promoting the ease of analog signal processing. The dark current would otherwise increase with the increase in image reading time due to the inherent characteristics of CCDs, reducing the dynamic range of an output signal.

Various modifications will become possible for those skilled in the art after receiving the teachings of the present disclosure without departing from the scope thereof.

What is claimed is:

1. An image reading method for an image recording system, comprising the steps of:
   (a) reading an optical image having a fixed one-line scanning period for predetermined time period to produce an image data;
   (b) repeating, when said predetermined time period and said fixed one-line scanning period are different from each other said reading of the optical image in step (a) by the number of times that the fixed one-line scanning period is divided by the predetermined period; and
   (c) averaging the image data produced after repeating the reading of the optical image in step (b).

2. An image reading method for an image recording system, comprising the steps of:
   (a) reading an optical image having a fixed one-line scanning period for a predetermined time period to produce an image data;
   (b) repeating, when said predetermined period and said fixed one-line scanning period are different from each other, said reading of the optical image in step (a) by the number of times that the fixed one-line scanning period is divided by the predetermined time period and one time for any residual of the division;
   (c) compensating for the image data read after repeating the reading of the optical image one time for the residual of the division by a time ratio of the predetermined time period to the remaining partial time; and
   (d) averaging all of the image data produced after steps (b) and (c).

3. An image reading method for an image recording system, comprising the steps of:
   (a) reading an optical image having a fixed one-line scanning period for a predetermined time period to produce an image data;
   (b) transferring the image data having a fixed one-line period to a shift register for a predetermined time (t1) and producing the image data for a predetermined second time (t2);
   (c) repeating, when said predetermined period and said fixed one-line scanning period are different from each other said reading of the optical image by the number of times that the fixed one-line scanning period is divided by the predetermined time period and one time for any residual of the division;
   (d) compensating for the image data read after repeating the reading of any optical image one time for the residual of the division by a time ratio of the predetermined time period to the remaining partial time; and
   (e) averaging all of the image data produced after steps (b) to (d).

4. An image reading method for an image recording system, comprising the steps of:
   (a) reading an optical image by photoelectric signal converting means having a fixed light quantity storage time period for converting a light quantity into an image data and producing said image data;
   (b) repeating, when a fixed one-line printing period for recording a one-line image data and said fixed light quantity storage time period are different from each other, said reading of the optical image in step (a) by the number of times that the fixed one-line printing period is divided by the fixed light quantity storage time period;
   (c) averaging the image data produced after repeating the reading of the optical image in step (b); and
   (d) recording said one-line image data for said fixed one-line printing period in accordance with averaging of the image data in step (c).

5. An image reading method for an image recording system, comprising the steps of:
   (a) reading an optical image by photoelectric signal converting means having a fixed light quantity storage time period for converting a light quantity into an image data and producing said image data;
   (b) repeating, when a fixed one-line printing period for recording a one-line image data and said fixed light quantity storage time period are different from each other, said reading of the optical image in step (a) by the number of times that the fixed one-line printing period is divided by the fixed light quantity storage time period and for a residual of the division;
   (c) compensating for the image data read after repeating the reading of optical image for the residual of the division by a time ratio of the fixed light quantity storage time period to the remaining partial time period;
   (d) averaging all of the image data produced after steps (b) and (c); and
   (e) recording said one-line image data for said fixed one-line printing period in accordance with the averaging of the image data in step (d).

6. An image reading method for an image recording system, comprising the steps of:
   (a) reading an optical image by photoelectric signal converting means having a fixed light quantity storage time period (T1) for converting a light quantity into an image data and producing said image data;

(b) transferring a one-line image data of said image data produced in step (a) to a shift register for a predetermined time period (t1);

(c) repeating, when a fixed one-line printing period for recording said one-line image data and said fixed light quantity storage time period are different from each other, said reading of the optical image in step (a) by the number of times that the fixed one-line printing period is divided by the fixed light quantity storage time period;

(d) averaging, when a time period of a residual of the division is smaller than said predetermined time period (t1), the image data except for both the image data converted for said time period of the residual of the division and the image data transferred for said time period of the residual of the division; and (e) recording said one-line image data for said fixed one-line printing period in accordance with the averaging of the image data in step (d).

* * * * *